(12) United States Patent
Momoda et al.

(10) Patent No.: US 6,698,883 B2
(45) Date of Patent: Mar. 2, 2004

(54) CURABLE COMPOSITION AND PHOTOCHROMIC CURED ARTICLE

(75) Inventors: Junji Momoda, Tokuyama (JP); Hironobu Nagou, Tokuyama (JP); Toshiaki Otani, Tokuyama (JP)

(73) Assignee: Tokuyama Corporation, Yamaguchi (JP)

( * ) Notice: Subject to any disclaimer, the term of this patent is extended or adjusted under 35 U.S.C. 154(b) by 50 days.

(21) Appl. No.: 10/048,407

(22) PCT Filed: May 31, 2001

(86) PCT No.: PCT/JP01/04608
§ 371 (c)(1), (2), (4) Date: Apr. 15, 2002

(87) PCT Pub. No.: WO01/92414
PCT Pub. Date: Dec. 6, 2001

(65) Prior Publication Data
US 2003/0008958 A1 Jan. 9, 2003

(30) Foreign Application Priority Data
May 31, 2000 (JP) .......... 2000-163300

(51) Int. Cl.$^7$ ............ G02B 5/23; G02C 7/10; C08F 216/20; C08F 290/06; C08F 228/04
(52) U.S. Cl. ............ 351/162; 252/586; 264/1.32; 359/241
(58) Field of Search ............ 252/586; 359/241; 351/162; 264/1.32

(56) References Cited

U.S. PATENT DOCUMENTS

| | | | | |
|---|---|---|---|---|
| 3,171,869 A | * | 3/1965 | Weinberg | |
| 4,792,224 A | * | 12/1988 | Kwiatkowski et al. | 252/586 X |
| 4,994,208 A | * | 2/1991 | McBain et al. | 252/586 |
| 5,246,630 A | * | 9/1993 | Selvig | 252/586 |
| 5,886,764 A | * | 3/1999 | Engardio et al. | 264/1.32 X |
| 5,973,093 A | * | 10/1999 | Daughenbaugh et al. | 252/586 X |
| 5,981,634 A | * | 11/1999 | Smith et al. | 252/586 X |
| 6,206,673 B1 | * | 3/2001 | Lipscomb et al. | 264/1.32 X |

FOREIGN PATENT DOCUMENTS

| | | | |
|---|---|---|---|
| EP | 0 773 272 | * | 5/1997 |
| JP | 01-201306 | * | 8/1989 |
| JP | 02 229808 | * | 9/1990 |
| JP | 03 009344 | * | 1/1991 |
| WO | WO97 03373 | * | 1/1997 |
| WO | WO97 06944 | * | 2/1997 |

* cited by examiner

Primary Examiner—Richard D. Lovering
(74) Attorney, Agent, or Firm—Sherman & Shalloway

(57) ABSTRACT

A photochromic cured product exhibiting excellent photochromic properties such as a high color density and a high fading rate, as well as excellent base material properties such as a high hardness and a large heat resistance.

24 Claims, No Drawings

CURABLE COMPOSITION AND PHOTOCHROMIC CURED ARTICLE

This application is a 371 of PCT/JP 01/04608 filed May 31, 2001.

BACKGROUND ART

The present invention relates to a novel photochromic cured product having excellent photochromic properties and base material properties, and to a curable composition that gives the above cured product.

Photochromism is a phenomenon that is drawing attention in the past several years, and is a reversible action in that a compound quickly changes its color when it is irradiated with light containing ultraviolet rays such as of sunlight or light of a mercury lamp, and resumes its initial color when it is no longer irradiated with light and is placed in a dark place. The compound having such properties is called photochromic compound. A variety of compounds have heretofore been synthesized without, however, any particular common nature in their structures.

The present inventors have forwarded the study concerning a series of photochromic compounds, have succeeded in synthesizing novel photochromic compounds such as fulgimide compounds, spirooxazine compounds and chromene compounds, have discovered that these compounds exhibit excellent photochromic properties, and have already proposed them.

Through the study conducted by the present inventors up to now, it has been learned that the photochromic properties such as color density and fading rate of the photochromic compounds are retarded to a considerable degree in high molecules as compared to those in a solution. This phenomenon becomes conspicuous particularly when the compound has photochromic molecules of large sizes. The occurrence of this phenomenon is attributed to that a free space in which the molecules of the photochromic compound are allowed to freely move is very smaller in a matrix such as of high molecules than in a solution.

In order to solve this problem, it can be contrived to soften the base material by lowering the glass transition temperature of a high-molecular material that constitutes a matrix, or to expand free space in the matrix.

When a base material having a low glass transition temperature is simply used, however, the hardness is lost arousing a problem when the composition is used for such applications as lenses that require hardness. Further, when the high-molecular material having a large free space is used as a matrix, the hardness usually varies to a large extent depending upon the temperature. Namely, a relatively high hardness may be exhibited near room temperature but the hardness sharply decreases as the temperature rises (hereinafter also referred to as "heat resistance is low"), and the shock resistance decreases, too.

For example, the specification of U.S. Pat. No. 5,739,243 teaches a system of a combination of an alkylene glycol dimethacrylate of a predetermined long chain and a polyfunctional methacrylate having not less than three radically polymerizable groups. According to this combination, the color density and the fading rate are improved to a considerable degree, which, however, are not still satisfactory, and it is desired to further improve the properties. Besides, the above technology is to obtain a base material having excellent flexibility. Therefore, the base materials concretely demonstrated in the Examples have low hardnesses, permit heat resistance to decrease, and involve much optical distortion.

The specification of U.S. Pat. No. 5,811,503 teaches a system of a combination of a long-chain alkylene glycol dimethacrylate, a dimethacrylate and a polyfunctional methacrylate having three or more radically polymerizable groups. However, even this combination has room for improvement concerning the color-developing rate and fading rate. Like those described above, further, the hardness of the base material decreases, heat resistance decreases, and optical distortion is much involved.

Further, the specification of U.S. Pat. No. 5,708,064 discloses a combination of a dimethacrylate using bisphenol A as a skeleton and a monofunctional alkylene glycol methacrylate. Though this combination exhibits considerably good color-developing sensitivity and fading rate which constitute photochromic properties, there still remains room for further improvement.

As described above, photochromic properties and base material properties have not all been satisfied yet.

DISCLOSURE OF THE INVENTION

It is therefore an object of the present invention to provide a photochromic cured product having excellent photochromic properties such as a high color density and a high fading rate, as well as excellent base material properties such as a high hardness and a high heat resistance.

The present invention was proposed in order to achieve the above-mentioned object, and was completed based on a knowledge that when a combination of a particular allyl ether or allylthio ether compound and other radically polymerizable monomer, is mixed with a photochromic compound and when the thus obtained curable composition is cured to obtain a cured product, there are exhibited excellent photochromic properties such as a high color density and a large fading rate and, besides, excellent base material properties are exhibited, such as a high hardness and a high heat resistance.

That is, the present invention is concerned with a curable composition comprising:

(A) an allyl ether or allylthio ether compound represented by the following general formula (1),

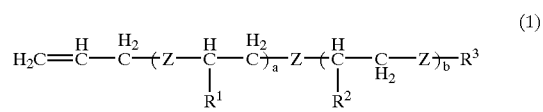

wherein $R^1$ and $R^2$ are, independently from each other, hydrogen atoms or alkyl groups, $R^3$ is an alkyl group, an acyl group, an acryloyl group, a methacryloyl group, a vinyl group or a styryl group, Z is an oxygen atom or a sulfur atom, and a and b are, independently from each other, from 0 to 20 in average, a+b being from 3 to 20;

(B) a radically polymerizable monomer other than (A) above; and (C) a photochromic compound.

Another invention is concerned with a photochromic cured product obtained by curing the above curable composition.

BEST MODE FOR CARRYING OUT OF THE INVENTION

An allyl ether or allylthio ether compound used for the curable composition of the present invention is represented by the following general formula (1),

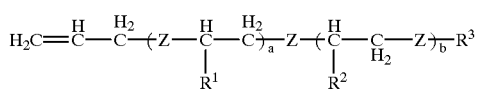

(1)

wherein R¹ and R² are, independently from each other, hydrogen atoms or alkyl groups, R³ is an alkyl group, an acyl group, an acryloyl group, a methacryloyl group, a vinyl group or a styryl group, Z is an oxygen atom or a sulfur atom, and a and b are, independently from each other, from 0 to 20 in average, a+b being from 3 to 20.

Owing to the use of the above allyl ether or allylthio ether compound, the photochromic cured product obtained by curing the curable composition of the present invention exhibits a very high color density and a markedly high fading rate.

Many of the existing curable compositions that have been known for their relatively excellent photochromic properties, exhibit low hardnesses and low heat resistances even after they have been cured. However, the curable composition of the present invention using the above-mentioned particular monomer does not permit the hardness and heat resistance to decrease greatly after it has been cured. Therefore, when there is used a monomer that could become a cured product of a high hardness as other radically polymerizable monomer that is to be copolymerized, it is made possible to obtain a photochromic cured product exhibiting excellent photochromic properties such as a high color density and a high fading rate, as well as a high hardness and a high heat resistance.

Here, it is desired that R¹ and R² are alkyl groups having 1 to 5 carbon atoms and, particularly, alkyl groups having 1 to 2 carbon atoms, such as methyl groups or ethyl groups.

It is further desired that R³ is an alkyl group same as the one denoted by R¹ and R². It is desired that the acyl group is the one having 2 to 15 atoms, such as acetyl group, propionyl group, butyryl group, benzoyl group or naphthoyl group.

The monomer represented by the above-mentioned general formula (1) is usually obtained in the form of a mixture of molecules of different molecular weights. Therefore, a and b representing the numbers of the alkylene oxide units, express average numbers of units of the mixture as a whole. When the unit numbers are thus expressed, a and b are, independently from each other, from 0 to 20 in average, and a+b is from 3 to 20. When either a or b is 0, the alkylene oxide units are those of a single kind. When a and b are not simultaneously 0, the alkylene oxide units of different kinds are recurring in a unit of a block.

From the standpoint of obtaining excellent photochromic properties in relation to the color density and the fading rate in the present invention, it is particularly desired that R¹ and R² are hydrogen atoms or alkyl groups having 1 to 2 carbon atoms, R³ is an alkyl group having 1 to 2 carbon atoms or an acyl group having 2 to 10 carbon atoms, and a and b are, independently from each other, from 0 to 10 in average, a+b being from 4 to 12.

Concrete examples of the allyl ether or allylthio ether compound that can be preferably used in the present invention include the following compounds.

Methoxypolyethylene glycol allyl ether having an average molecular weight of 550, methoxypolyethylene glycol allyl ether having an average molecular weight of 350, methoxypolyethylene glycol allyl ether having an average molecular weight of 1500, polyethylene glycol allyl ether having an average molecular weight of 450, methoxypoly- ethylene glycol-polypropylene glycol allyl ether having an average molecular weight of 750, butoxypolyethylene glycol-polypropylene glycol allyl ether having an average molecular weight of 1600, methacryloxypolyethylene glycol-polypropylene glycol allyl ether having an average molecular weight of 560, phenoxypolyethylene glycol allyl ether having an average molecular weight of 600, methacryloxypolyethylene glycol allyl ether having an average molecular weight of 430, acryloxypolyethylene glycol allyl ether having an average molecular weight of 420, vinyloxypolyethylene glycol allyl ether having an average molecular weight of 560, styryloxypolyethylene glycol allyl ether having an average molecular weight of 650, and methoxypolyethylene thioglycol allyl thioether having an average molecular weight of 730. These allyl ethers or allyl thioether compounds can be used in a single kind or in a combination of a plurality of kinds.

In the present invention, there can be used any known radically polymerizable monomer (hereinafter also referred to simply as "other radically polymerizable monomer") other than the above-mentioned allyl ether or allylthio ether compounds without limitation provided it is copolymerizable with the allyl ether or allylthio ether compounds. As the radically polymerizable group, there can be exemplified methacryloyl group, acryloyl group, vinyl group and allyl group.

It is desired that the other radically polymerizable monomer is polymerized with a bifunctional or a polyfunctional polymerizable monomer (hereinafter also referred to simply as a "high-hard monomer") that exhibits an L-scale Rockwell hardness of not smaller than 60, more preferably, from 65 to 130 and, particularly, from 80 to 130 when it is homopolymerized to form a polymer. Upon using the high-hard monomer, the photochromic cured product of the present invention exhibits particularly excellent base material properties such as a hardness and a heat resistance.

Here, the L-scale Rockwell hardness stands for a hardness measured in compliance with JIS-B7726. Upon taking a measurement from the homopolymers of the monomers, it is allowed to easily judge whether the above-mentioned hardness conditions are satisfied. Concretely, the monomer is polymerized to obtain a polymer having a thickness of 2 mm, which is, then, left to stand in a chamber of 25° C. a whole day. Thereafter, by using a Rockwell hardness tester, the polymer is easily measured for its L-scale Rockwell hardness as will be described later in Examples.

The polymer from which the L-scale Rockwell hardness is measured, is obtained by the cast polymerization by selecting a suitable polymerization initiator and a polymerization temperature depending upon the kind of the radically polymerizable monomer and under such conditions that the monomer that is fed is polymerized by an amount of not less than 90 mol % and, preferably, not less than 95 mol %. Upon using the radically polymerizable monomer which exhibits the L-scale Rockwell hardness satisfying the above value when it is homopolymerized to form a polymer at the above weight ratio, the present invention makes it possible to obtain a vary favorable effect concerning the base material properties such as a hardness and a heat resistance.

Among the high-hard monomers, there can be used, without limitation, any known polyfunctional polymerizable monomer which, when homopolymerized, exhibits the L-scale Rockwell hardness of not smaller than 60 (hereinafter also referred to simply as "high-hard monomer 1") provided the homopolymer obtained through the homopolymerization exhibits the L-scale Rockwell hardness satisfying the above value and provided it is a radically polymerizable monomer having not less than three radically polymerizable groups in the molecule. It is desired that the radically polymerizable monomer has 3 to 6 radically polymerizable groups in the molecule from the standpoint of easy availability on an industrial scale.

As the highly hard monomer 1 that can be favorably used, there can be exemplified trimethacrylate derivative, triacrylate derivative, tetramethacrylate derivative, tetraacrylate derivative, triisocyanate derivative, tetraisocyanate derivative, triol derivative, trithiol derivative, tetrathiol derivative, triepoxy derivative, triurethane methacrylate derivative, tetraurethane methacrylate derivative, hexaurethane methacrylate derivative, trivinyl derivative, tetravinyl derivative and triallyl derivative. Among them, there are preferably used those having a methacryloyl group or an acryloyl group, such as trimethacrylate derivative, triacrylate derivative, tetramethacrylate derivative, tetraacrylate derivative, triurethane methacrylate derivative, tetraurethane methacrylate derivative and hexaurethane methacrylate derivative.

Among them, it is desired to use the polyfunctional polymerizable monomer represented by the following general formula (2),

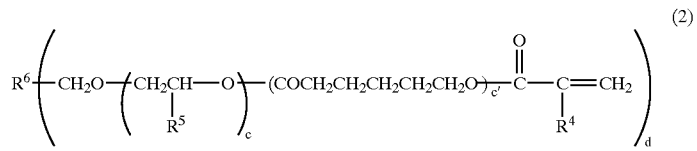

wherein $R^4$ and $R^5$ are, independently from each other, hydrogen atoms or alkyl groups having 1 to 2 carbon atoms (or methyl groups or ethyl groups), $R^6$ is an organic residue having a valency of 3 to 6, c is from 0 to 3 in average, c' is from 0 to 3 in average, and d is an integer of from 3 to 6, from the standpoint of easy availability of the starting materials and easy adjustment of the hardness of the cured product.

In the above-mentioned general formula, $R^6$ is an organic residue having a valency of 3 to 6. Concrete examples include a group derived from polyol, a hydrocarbon group having a valency of 3 to 6, or an organic group containing an ester bond or an urethane bond.

Concrete examples of the polyfunctional polymerizable monomer represented by the above-mentioned general formula (2) that can be preferably used include trimethylolpropane trimethacrylate, trimethylolpropane triacrylate, tetramethylolmethane trimethacrylate, tetramethylolmethane triacrylate, trimethylolpropane trimethacrylate, tetramethylolmethane tetramethacrylate, tetramethylolmethane tetraacrylate, trimethylolpropane triethylene glycol trimethacrylate, trimethylolpropane triethylene glycol triacrylate, ethoxylated pentaerythritol tetraacrylate, ethoxylated pentaerythritol tetramethacrylate, pentaerythritol trimethacrylate, pentaerythritol tetramethacrylate, dipentaerythritol hexaacrylate, polyester oligomer hexaacrylate, caprolactone-modified dipentaerythritol hexaacrylate, triurethane oligomer tetraacrylate, and urethane oligomer hexamethacrylate. These polyfunctional polymerizable monomers may be used being mixed in two or more kinds together.

Among the high-hard monomers, there can be used, without limitation, any bifunctional polymerizable monomer which, when homopolymerized, exhibits the L-scale Rockwell hardness of not smaller than 60 (hereinafter also referred to simply as "high-hard monomer 2") provided the homopolymer obtained through the homopolymerization exhibits the L-scale Rockwell hardness satisfying the above value and provided it is a radically polymerizable monomer having two radically polymerizable groups in the molecule.

As the bifunctional polymerizable monomer that can be preferably used, there can be exemplified dimethacrylate derivative, diacrylate derivative, divinyl derivative, diallyl derivative, dicyano derivative, diol derivative, dithiol derivative, urethane dimethacrylate derivative, urethane diacrylate derivative and diepoxy derivative. Among them, there can be exemplified those having a methacryloyl group, such as dimethacrylate derivative, urethane dimethacrylate derivative and urethane diacrylate derivative.

Among them, it is particularly desired to use a bifunctional polymerizable monomer represented by the following general formula (3) or by the following general formula (4) from the standpoint of easy availability of the starting materials and easy adjustment of the hardness.

That is, as the high-hardness polymer 2, there can be preferably used a bifunctional polymerizable monomer represented by the following general formula (3),

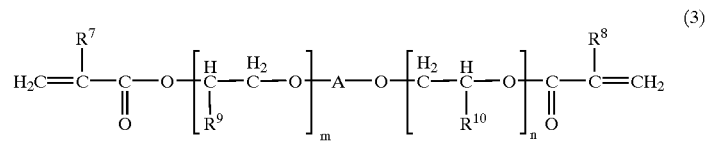

wherein $R^7$ and $R^8$ are methyl groups, $R^9$ and $R^{10}$ are, independently from each other, hydrogen atoms or alkyl groups having 1 to 2 carbon atoms, and A is a straight-chain or branched alkylene group, a substituted or unsubstituted phenylene group, a group represented by the following formula (I),

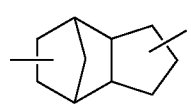

or a group represented by the following formula (II),

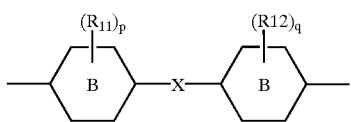

(II)

wherein $R^{11}$ and $R^{12}$ are, independently from each other, alkyl groups having 1 to 4 carbon atoms (or methyl groups, ethyl groups, propyl groups, butyl groups etc.), chlorine atoms or bromine atoms, p and q are, independently from each other, integers of from 0 to 4, a ring represented by the following formula (III)

(III)

is a benzene ring or a cyclohexane ring, and when the ring represented by the following formula (III)

(III)

is a benzene ring, X is any one of the groups represented by the following formulas (IV)

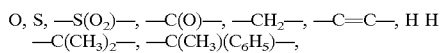

(IV)

or is a group represented by the following formula

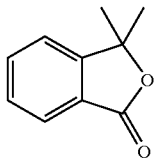

(V)

and when the ring represented by the following formula (III)

(III)

is a cyclohexane ring, X is any one of the groups represented by the following formulas (VI)

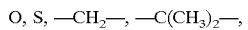

(VI)

and m and n are not smaller than 1, respectively, m+n being from 2 to 6 in average.

In the above general formula (3), the straight-chain or branched alkylene group represented by A may be the one having 2 to 9 carbon atoms, such as ethylene group, propylene group, butylene group, neopentylene group, hexylene group or nonylene group. As the substituent for the phenylene group represented by A, there can be preferably used an alkyl group having 1 to 4 carbon atoms (or methyl group, ethyl group, propyl group, butyl group, etc.), chlorine atom or bromine atom.

The bifunctional polymerizable monomer represented by the above general formula (3) is usually obtained in the form of a mixture of molecules with m and n which are not the same. In the above formula, therefore, m and n represent average values.

As the high-hard monomer 2, further, there is preferably used a bifunctional polymerizable monomer represented by the following formula (4),

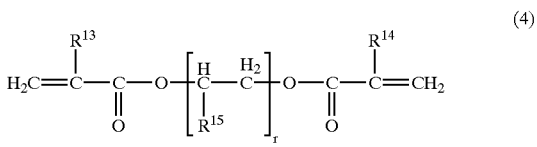

(4)

wherein $R^{13}$ and $R^{14}$ are methyl groups, $R^{15}$ is a hydrogen atom or an alkyl group having 1 to 2 carbon atoms, and r is from 1 to 6 in average and is, preferably, from 2 to 6.

In the bifunctional polymerizable monomer represented by the above general formula (4), too, r is an average value.

Concrete examples of the bifunctional polymerizable monomer represented by the above formula (3) or the above formula (4) include diethylene glycol dimethacrylate, triethylene glycol dimethacrylate, tetraethylene glycol dimethacrylate, tripropylene glycol dimethacrylate, tetrapropylene glycol dimethacrylate, nonaethylene glycol dimethacrylate, nonapropylene glycol dimethacrylate, ethylene glycol bisglycidyl methacrylate, bisphenol A dimethacrylate, 2,2-bis(4-methacryloyloxyethoxyphenyl) propane, 2,2-bis(3,5-dibromo-4-methacryloyloxyethoxyphenyl)propane, 1,4-butylene glycol ethylenedimethacrylate, 1,9-nonylene glycol dimethacrylate, neopentylene glycol dimethacrylate, and bis(2-methacryloyloxyethylthioethyl)sulfide. These bifunctional polymerizable monomers may be used being mixed in two or more kinds together.

Other examples of the high-hard monomer 2 (bifunctional polymerizable monomer) include those represented by the following formula (5),

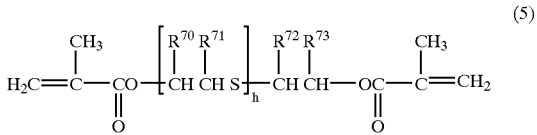

(5)

wherein $R^{70}$, $R^{71}$, $R^{72}$ and $R^{73}$ may be the same or different, and are hydrogen atoms or methyl groups, and h is an integer of from 1 to 10.

Concrete examples of the bifunctional polymerizable monomer represented by the above formula (5) include bis(methacryloyloxyethyl)sulfide, 1,2-bis(methacryloyloxyethylthio)methane, bis(2-methacryloyloxyethylthioethyl)sulfide, 1,2-bis(methacryloyloxyethylthioethylthio)ethane, and 1,2-bis(methacryloyloxyisopropylthioisopropylethyl)sulfide.

Further examples of the high-hard monomer 2 (bifunctional polymerizable monomer) include those represented by the following formula (6),

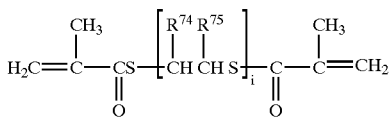

(6)

wherein $R^{74}$ and $R^{75}$ may be the same or different, and are hydrogen atoms or methyl groups, and i is an integer of from 1 to 10.

Concrete examples of the bifunctional polymerizable monomer represented by the above formula (6) include 1,2-bis(methacryloylthio)ethane, bis(2-methacryloylthioethyl)sulfide, and bis(2-methacryloylthioethylthioethyl)sulfide.

The cured products obtained from the compounds represented by the above general formulas (5) and (6) exhibit high refractive indexes or, concretely, refractive indexes of not smaller than 1.56 and high Abbe's numbers, lending themselves well for obtaining photochromic lenses.

In the present invention, it is desired to use the high-hard monomer 1 and the high-hard monomer 2 in combination from the standpoint of improving the hardness and heat resistance of the cured product and of improving the moldability. In this case, it is desired that the ratio of the two is such that the high-hard monomer 1 is from 2 to 50% by mass and, particularly, from 3 to 40% by mass and that the high-hard monomer 2 is from 50 to 98% by mass and, particularly, from 60 to 97% by mass based on the weight of the high-hard monomers as a whole.

In the present invention, further, other radically polymerizable monomer is preferably a compound (hereinafter also referred to simply as "epoxy monomer") having one radically polymerizable group and at least one epoxy group in the molecule from the standpoint of excellent color-developing sensitivity and fading rate which are photochromic properties and excellent light resistance. It is particularly desired that the epoxy monomer is used in combination with the above-mentioned high-hard monomers.

As the epoxy monomer, there can be preferably used a compound represented by the following general formula (7),

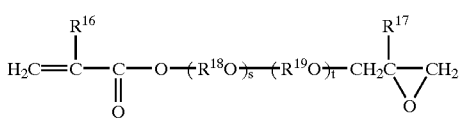

(7)

wherein $R^{16}$ and $R^{17}$ are, independently from each other, hydrogen atoms or methyl groups, $R^{18}$ and $R^{19}$ are, independently from each other, alkylene groups having 1 to 4 carbon atoms which may be substituted with a hydroxy group, or groups represented by the formula (VII),

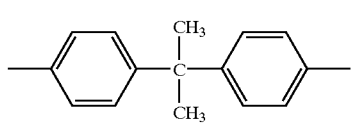

(VII)

and s and t are from 0 to 20 in average, respectively.

As the alkylene group represented by $R^{18}$ and $R^{19}$, there can be exemplified methylene group, ethylene group, propylene group, butylene group, trimethylene group and tetramethylene group. Further, s and t are average values.

Among the compounds represented by the above formula (7), preferred examples include glycidyl acrylate, glycidyl methacrylate, β-methyl glycidyl methacrylate, bisphenol A-monoglycidyl ether methacrylate, 4-glycidyloxy methacrylate, 3-(glycidyl-2-oxyethoxy)-2-hydroxypropyl methacrylate, 3-(glycidyloxy-1-isopropyloxy)-2-hydroxypropyl acrylate, 3-glycidyloxy-2-hydroxypropyloxy)-2-hydroxypropyl acrylate, and glycidyloxypolyethylene glycol methacrylate having an average molecular weight of 540. Among them, glycidyl acrylate and glycidyl methacrylate are particularly desired.

When the epoxy monomer is used in combination with the radically polymerizable monomer such as the high-hard monomer, it is desired that the ratio of blending the epoxy monomer is from 0.01 to 30% by mass and, particularly, from 0.1 to 20% by mass based on the whole weight of the other radically polymerizable monomer.

In the present invention, further, the other radically polymerizable monomer is desirably a polymerizable monomer (hereinafter also referred to simply as "low-hard monomer") which, when homopolymerized, exhibits the L-scale Rockwell hardness of not larger than 40 from the standpoint of further improving the strength of the lens and improving the fading rate which constitutes the photochromic properties. It is particularly desired that the low-hard monomer is used in combination with the high-hard monomer described above.

As the low-hard monomer, there can be used, without limitation, a known polymerizable monomer that satisfies the requirements related to the hardness of the homopolymer. In particular, it is desired to use the one represented by the following general formula (8) or by the following general formula (9).

That is, a compound represented by the general formula (8),

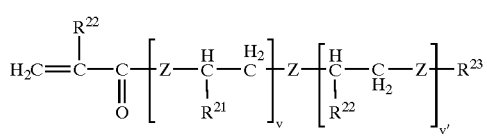

(8)

wherein $R^{20}$, $R^{21}$ and $R^{22}$ are, independently from each other, hydrogen atoms or alkyl groups having 1 to 2 carbon atoms, $R^{23}$ is a hydrogen atom, an alkyl group having 1 to 25 carbon atoms, an alkoxyalkyl group, an aryl group, an acyl group, an alkyloxy group having an epoxy group at the terminal, a methacryloyl group, an acryloyl group, a haloalkyl group or an oleyl group, Z is an oxygen atom or a sulfur atom, v and v' are, independently from each other, from 0 to 70 in average, and when $R^{20}$ is an alkyl group and $R^{23}$ is a methacryloyl group, v+v' is 7 to 70, when $R^{20}$ is an alkyl group and $R^{23}$ is a group other than the methacryloyl group or the acryloyl group, v+v' is 4 to 70, and when $R^{20}$ is a hydrogen atom, v+v' is 1 to 70.

It is further desired that when $R^{20}$ is an alkyl group and $R^{23}$ is a methacryloyl group, v+v' is 7 to 12 and, particularly, 8 to 10 in average, when $R^{20}$ is an alkyl group and $R^{23}$ is a group other than the methacryloyl group or the acryloyl group, v+v' is 4 to 40 and, particularly, 6 to 23 in average and when $R^{20}$ is a hydrogen atom, v+v' is 1 to 25 and, particularly, 1 to 10 in average from the standpoint of further improving the fading rate which constitutes the photochromic properties and to further improve the moldability of the lens.

Among them, it is desired that $R^{20}$ in the general formula (8) is a hydrogen atom (acryloyl group) from the standpoint of lowering the hardness. It is further desired that $R^{20}$ in the general formula (8) is a hydrogen atom and $R^{23}$ is an acryloyl group from the standpoint of maintaining the strength of the cured product while lowering the hardness.

When $R^{20}$ in the general formula (8) is an alkyl group, on the other hand, it is desired that $R^{23}$ is an alkyl group having 1 to 25 carbon atoms, an alkoxyalkyl group, an acyl group, an aryl group, an alkyl group having an epoxy group at a terminal thereof, a haloalkyl group or an oleyl group.

It is further desired that $R^{21}$ and $R^{22}$ are hydrogen atoms.

Concrete examples of the compound represented by the above formula (8) include polyethylene glycol methacrylate having an average molecular weight of 526, polyethylene glycol methacrylate having an average molecular weight of 360, methyl ether polyethylene glycol methacrylate having an average molecular weight of 496, methyl ether polyethylene glycol methacrylate having an average molecular weight of 1000, polypropylene glycol methacrylate having an average molecular weight of 375, polypropylene glycol methacrylate having an average molecular weight of 430, polypropylene glycol methacrylate having an average molecular weight of 622, methyl ether polyethylene glycol methacrylate having an average molecular weight of 620, methyl ether polyethylene glycol polypropylene glycol methacrylate having an average molecular weight of 596, polytetramethylene glycol methacrylate having an average molecular weight of 566, octylphenyl ether polyethylene glycol methacrylate having an average molecular weight of 2034, nonyl ether polyethylene glycol methacrylate having an average molecular weight of 610, methoxyethyl acrylate, methyl ether polyethylene glycol acrylate having an average molecular weight of 262, methyl ether polyethylene glycol acrylate having an average molecular weight of 482, methyl ether polyethylene glycol polypropylene glycol acrylate having an average molecular weight of 582, methylthio ether polyethylene glycol methacrylate having an average molecular weight of 640, perfluoroheptylethylene glycol methacrylate having an average molecular weight of 630, glycidyl polyethylene glycol methacrylate having an average molecular weight of 538, glycidyl acrylate, acetyloxyethyl acrylate, phenoxyethyl acrylate, benzyloxyethyl acrylate, acetylpolyethylene glycol methacrylate having an average molecular weight of 524, butylylpolyethylene glycol methacrylate having an average molecular weight of 566, benzoylpolyethylene glycol methacrylate having an average molecular weight of 586, nonylbenzoylpolyethylene glycol methacrylate having an average molecular weight of 689, butoxymethyl ether polyethylene glycol methacrylate having an average molecular weight of 568, polyethylene glycol dimethacrylate having an average molecular weight of 875, polytetramethylene glycol dimethacrylate having an average molecular weight of 650, polytetramethylene glycol dimethacrylate having an average molecular weight of 1400, polypropylene glycol dimethacrylate having an average molecular weight of 560, polyethylene glycol diacrylate having an average molecular weight of 214, polyethylene glycol diacrylate having an average molecular weight of 258, polyethylene glycol diacrylate having an average molecular weight of 302, polyethylene glycol diacrylate having an average molecular weight of 522, polyethylene glycol methacrylate acrylate having an average molecular weight of 272, and polyethylene glycol methacrylate acrylate having an average molecular weight of 536.

Further, there is used compounds of the general formula (9),

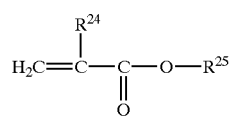

(9)

wherein $R^{24}$ is a hydrogen atom or a methyl group, and $R^{25}$ is an alkyl group having 1 to 40 carbon atoms when $R^{24}$ is a hydrogen atom, and is an alkyl group having 8 to 40 carbon atoms when $R^{24}$ is a methyl group.

Among them, it is desired to use the one in which $R^{25}$ is an alkyl group having 8 to 25 carbon atoms when $R^{24}$ is a methyl group, and the one in which $R^{25}$ is an alkyl group having 1 to 20 carbon atoms when $R^{24}$ is a hydrogen atom, from the standpoint of easy availability of the starting materials and photochromic properties.

Among the compounds represented by the above formula (9), preferred examples include stearyl methacrylate, lauryl methacrylate, ethyl hexyl methacrylate, methyl acrylate, ethyl acrylate, butyl acrylate and lauryl acrylate. Among them, methyl acrylate, ethyl acrylate, butyl acrylate and lauryl acrylate are particularly preferred.

When these low-hard monomers are used in combination with the radically polymerizable monomers which are the high-hard monomers described above, it is desired that the low-hard monomers are blended at a ratio of 0.1 to 20% by mass and, particularly, 0.5 to 10% by mass based on the weight of the whole other radically polymerizable monomers.

As the other radically polymerizable monomers, there can be used polymerizable monofunctional monomers, i.e., multi-valent allyl compounds such as diallyl phthalate, diallyl isophthalate, diallyl tartarate, diallyl epoxysuccinate, diallyl fumarate, diallyl chloroendoate, diallyl hexaphthalate and allyl diglycol carbonate; multi-valent thioacrylic acid and multi-valent thiomethacrylic acid ester compounds such as 1,2-bis(methacryloylthio)ethane, bis(2-acryloylthioethyl) ether, and 1,4-bis(methacryloylthiomethyl)benzene; unsaturated carboxylic acids such as acrylic acid, methacrylic acid and maleic anhydride; acrylic acid and methacrylic acid ester compounds such as methyl methacrylate, butyl methacrylate, benzyl methacrylate, phenyl methacrylate, 2-hydroxyethyl methacrylate and biphenyl methacrylate; fumaric acid ester compounds such as diethyl fumarate and diphenyl fumarate; thioacrylic acid and thiomethacrylic acid ester compounds such as methylthio acrylate, benzylthio acrylate, and benzylthio methacrylate; vinyl compounds such as styrene, chlorostyrene, methyl styrene, vinyl naphthalene, α-methylstyrene dimer, bromostyrene, and divinyl benzene; and (meth)acrylates having an unsaturated bond in the molecules and in which the hydrocarbon chain has 6 to 25 carbon atoms, such as oleyl methacrylate, nerol methacrylate, geraniol methacrylate, linalool methacrylate, and farnesol methacrylate. These compounds can be used in one kind or in two or more kinds, or in combination with the above-mentioned high-hard monomers and epoxy monomers without any limitation.

In the present invention, the allyl ether or allylthio ether compound and other radically polymerizable monomer are blended at such a ratio that the amount of the allyl ether or allylthio ether compound is from 0.001 to 30% by mass and the amount of the other radically polymerizable monomer is from 99.999 to 70% by mass per the total amount of the two of 100% by mass. More desirably, the amount of the allyl ether or allylthio ether compound is from 0.01 to 25% by mass and the amount of the other radically polymerizable monomer is from 99.99 to 75% by mass and, particularly, the amount of the allyl ether or allylthio ether compound is from 0.1 to 20% by mass and the amount of the other radically polymerizable monomer is from 99.9 to 80% by mass. When the blended amount of the allyl ether or allylthio ether compound is smaller than 0.001% by mass, the heat resistance of the lens tends to become small. When the blended amount exceeds 30% by mass, on the other hand, the color-developing sensitivity and the fading rate, which are the photochromic properties, tend to become small.

A known photochromic compound can be used without any limitation for the curable composition of the present invention. Known examples of the photochromic compound include fulgimide compounds, spirooxazine compounds and chromene compounds. These photochromic compounds can be used for the present invention.

As the fulgimide compounds, spirooxazine compounds and chromene compounds, there can be preferably used those compounds that have been disclosed in, for example, Japanese Unexamined Patent Publication (Kokai) No. 28154/1990, Japanese Unexamined Patent Publication (Kokai) No. 288830/1987, PCT International Patent Application 94/22850, and PCT International Patent Application 96/14596.

As the compounds that exhibit excellent photochromic properties, further, there can be preferably used those compounds that were newly found by the present inventors and have been disclosed in the pending patent applications (Japanese Patent Application No. 207871/1997, Japanese Patent Application No. 23110/1999, Japanese Patent Application No. 27959/1999, Japanese Patent Application No. 27961/1999, Japanese Patent Application No. 27960/1999, Japanese Patent Application No. 140836/1999, Japanese Patent Application No. 144072/1999, Japanese Patent Application No. 150690/1999, Japanese Patent Application No. 144074/1999, Japanese Patent Application No. 156270/1999, Japanese Patent Application No. 154272/1999, Japanese Patent Application No. 188146/1999, and Japanese Patent Application No. 188902/1999).

Among these photochromic compounds, the chromene compounds exhibit photochromic properties maintaining light resistance larger than that of other photochromic compounds, and are preferably used since they help greatly improve the color-developing sensitivity and fading rate which are the photochromic properties of the invention compared to other photochromic compounds. Among these chromene compounds, further, those compounds having molecular weights of not smaller than 540 are preferably used since they help greatly improve the color-developing sensitivity and fading rate which are the photochromic properties of the invention compared to other chromene compounds.

As the chromene compound that can be preferably used in the present invention, there can be exemplified the one represented by the following general formula (10),

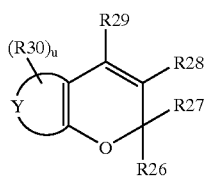

(10)

wherein a group represented by the following formula (VIII)

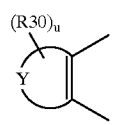

(VIII)

is a substituted or unsubstituted aromatic hydrocarbon group, or a substituted or unsubstituted unsaturated heterocyclic group, $R^{28}$, $R^{29}$ and $R^{30}$ are alkyl groups, alkoxy groups, aralkoxy groups, amino groups, substituted amino groups, cyano groups, substituted or unsubstituted aryl groups, halogen atoms, aralkyl groups, hydroxy groups, substituted or unsubstituted alkenyl groups, substituted or unsubstituted heterocyclic groups having a nitrogen atom as a hetero atom and in which the nitrogen atom is bonded to a pyran ring or to a ring of a group represented by the above formula (10), or condensed heterocyclic groups in which the hetercyclic group is condensed with an aromatic hydrocarbon ring or an aromatic heterocyclic ring, u is an integer of 0 to 6, and $R^{26}$ and $R^{27}$ are, independently from each other, groups represented by the following formula (IX),

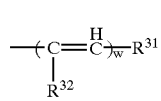

(IX)

wherein $R^{31}$ is a substituted or unsubstituted aryl group, or a substituted unsubstituted heteroaryl group, $R^{32}$ is a hydrogen atom, an alkyl group or a halogen atom, and w is an integer of 1 to 3, groups represented by the following formula (X),

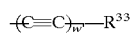

(X)

wherein $R^{33}$ is a substituted or unsubstituted aryl group, or a substituted or unsubstituted heteroaryl group, and w' is an integer of 1 to 3, substituted or unsubstituted aryl groups, substituted or unsubstituted heteroaryl groups, or alkyl groups, or $R^{26}$ and $R^{27}$ together may constitute an aliphatic hydrocarbon ring or an aromatic hydrocarbon ring.

Here, the substituents defined in connection with $R^{28}$ and $R^{30}$ can be applied to the substituents in the above-mentioned formulas (IX) and (X), and to the substituents of the substituted aryl group or of the substituted heteroaryl group described in connection with $R^{26}$ and $R^{27}$.

More preferred chromene compounds are those compounds represented by the following general formulas (XI) to (XIX), (XI)

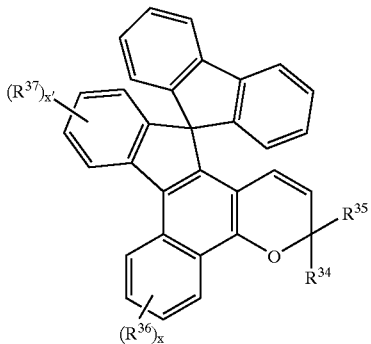

wherein $R^{34}$ and $R^{35}$ are the same as $R^{26}$ and $R^{27}$ described in the above general formula (10), $R^{36}$ and $R^{37}$ are the same as $R^{28}$, $R^{29}$ and $R^{30}$ described in the above formula (10), and x and x' are integers of 0 to 4, (XII)

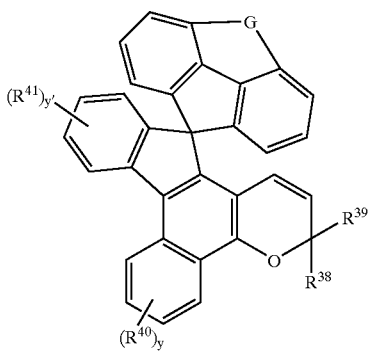

wherein $R^{38}$ and $R^{39}$ are the same as $R^{26}$ and $R^{27}$ described in the above general formula (10), $R^{40}$ and $R^{41}$ are the same as $R^{28}$, $R^{29}$ and $R^{30}$ described in the above formula (10), y and y' are integers of 0 to 4, and G is any one of the groups represented by the following formula (XIII), (XIII)

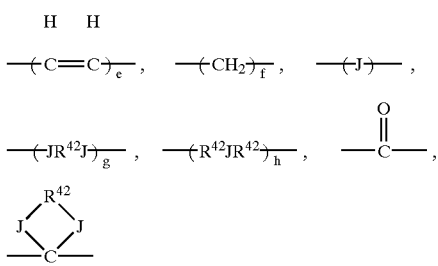

wherein J is an oxygen atom or a sulfur atom, $R^{42}$ is an alkylene group having 1 to 6 carbon atoms, and e, f, g and h are integers of 1 to 4, (XIV)

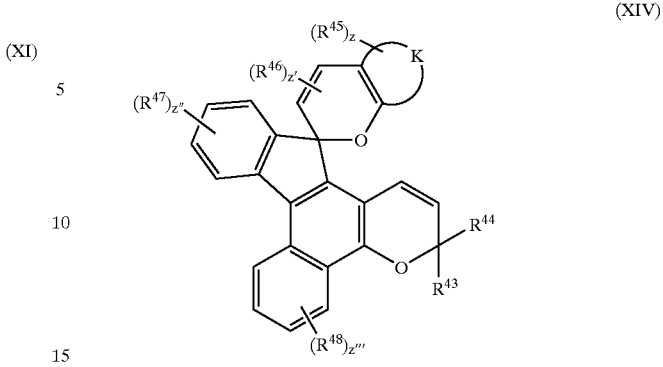

wherein $R^{43}$ and $R^{44}$ are the same as $R^{26}$ and $R^{27}$ described in the above general formula (10), $R^{45}$, $R^{46}$, $R^{47}$ and $R^{48}$ are the same as $R^{28}$, $R^{29}$ and $R^{30}$ described in the above formula (10), z is an integer of 0 to 6, z', z" and z''' are integers of 0 to 4, and a group represented by the following formula (XV)

(XV)

is a substituted or unsubstituted aromatic hydrocarbon group, or a substituted or unsubstituted unsaturated heterocyclic group, (XVI)

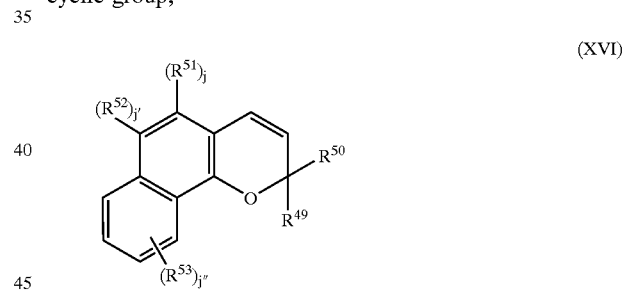

wherein $R^{49}$ and $R^{50}$ are the same as $R^{26}$ and $R^{27}$ described in the above general formula (10), $R^{51}$, $R^{52}$ and $R^{53}$ are the same as $R^{28}$, $R^{29}$ and $R^{30}$ described in the above formula (10), j and j' are 0 or 1, and j" is an integer of 0 to 4, (XVII)

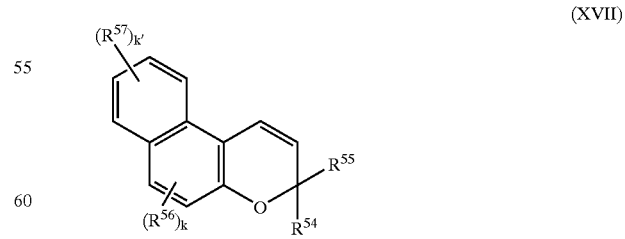

wherein $R^{54}$ and $R^{55}$ are the same as $R^{26}$ and $R^{27}$ described in the above general formula (10), $R^{56}$ and $R^{57}$ are the same as $R^{28}$, $R^{29}$ and $R^{30}$ described in the above formula (10), k is an integer of 0 to 2, and k' is an integer of 0 to 4, (XVIII)

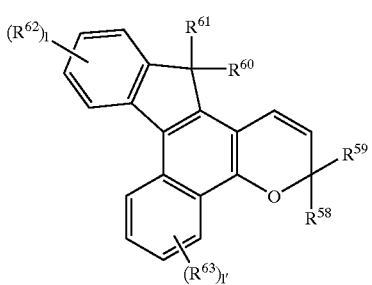

wherein $R^{58}$ and $R^{59}$ are the same as $R^{26}$ and $R^{27}$ described in the above general formula (10), $R^{60}$, $R^{61}$, $R^{62}$ and $R^{63}$ are the same as $R^{28}$, $R^{29}$ and $R^{30}$ described in the above formula (10), and l and l' are integers of 0 to 4, (XIX)

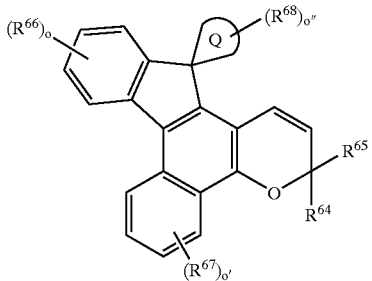

wherein $R^{64}$ and $R^{55}$ are the same as $R^{26}$ and $R^{27}$ described in the above general formula (10), $R^{66}$, $R^{67}$ and $R^{68}$ are the same as $R^{28}$, $R^{29}$ and $R^{30}$ described in the above formula (10), o and o' are integers of 0 to 4, o" is an integer of 0 to 6, and a ring represented by the following formula (XX), (XX)

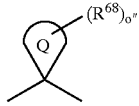

is an aliphatic hydrocarbon ring which may have up to 6 substituents.

More preferred chromene compounds of the present invention are those chromene compounds having the following structures:

(XXI)

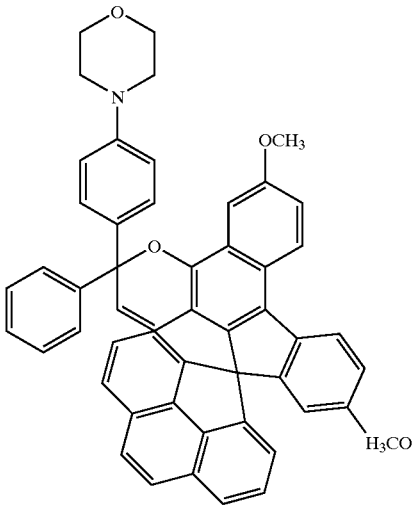

(XXII)

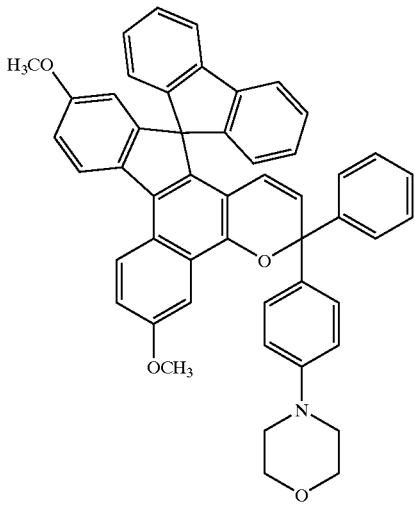

(XXIII)

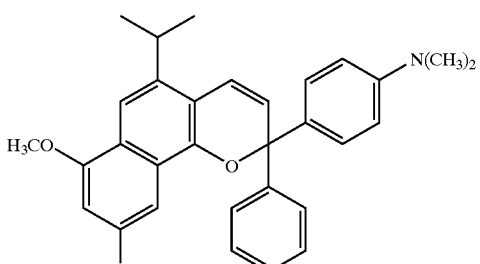

(XXIV)

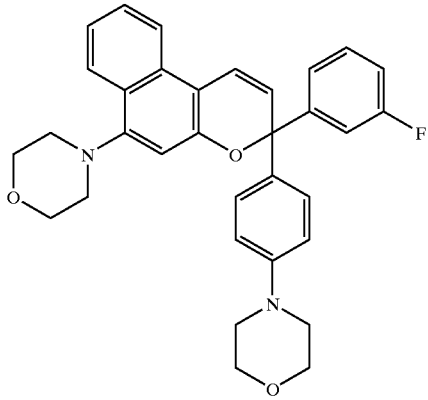

(XXV)

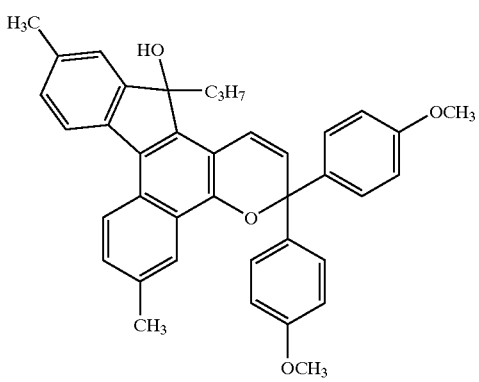

-continued

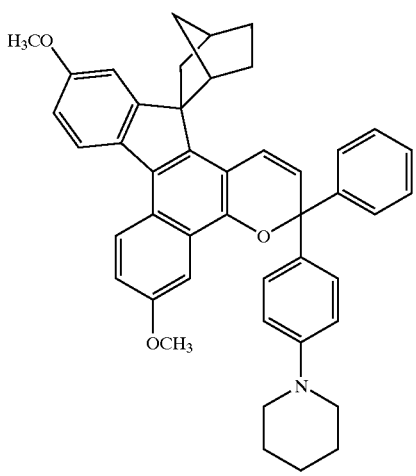
(XXVI)

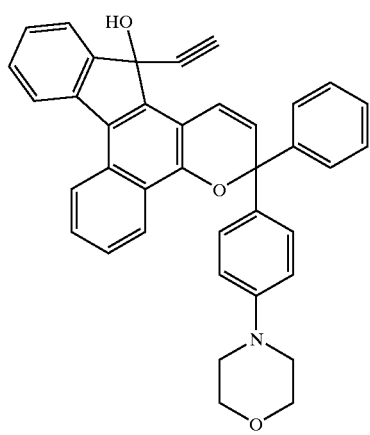
(XXVII)

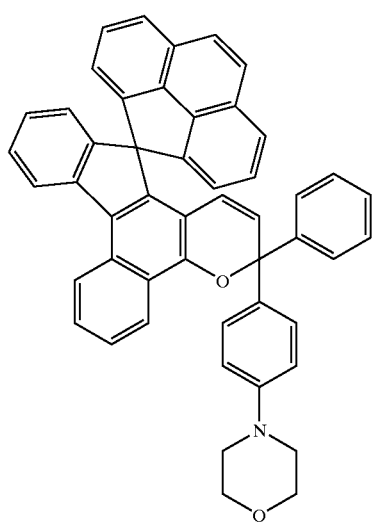
(XXVIII)

-continued

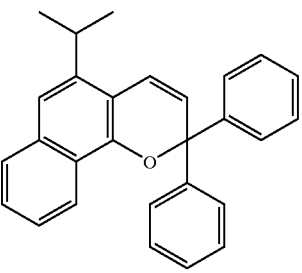
(XXIX)

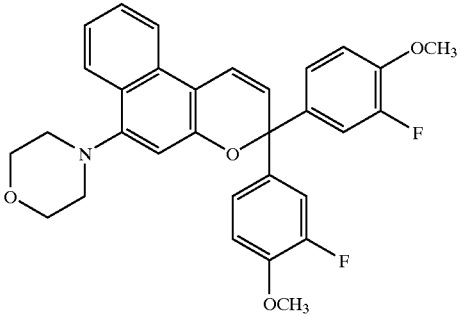
(XXX)

In the curable composition of the present invention, the photochromic compound is blended in an amount of from 0.0001 to 10 parts by weight, preferably, from 0.001 to 5 parts by weight and, more preferably, from 0.001 to 1 part by weight per a total amount (whole radically polymerizable monomers) of 100 parts by weight of the allyl ether or allylthio ether compound and other radically polymerizable monomers. When the blended amount of the photochromic compound is smaller than 0.0001 part by weight, the color density often becomes small. When the blended amount is not smaller than 10 parts by weight, on the other hand, the photochromic compound does not dissolve in the polymerizable monomer to a sufficient degree, and becomes non-uniform causing the color density to become irregular.

The curable composition of the present invention may be further blended with such additives as surfactant, antioxidant, radical-trapping agent, ultraviolet-ray stabilizer, ultraviolet-ray absorber, parting agent, tint-preventing agent, antistatic agent, fluorescent dye, dye, pigment, perfume and plasticizer, in order to improve light resistance of the photochromic compound, to improve color-developing rate, to improve fading rate and to improve moldability. As additives, known compounds can be used without any limitation.

As the surfactant, for example, there can be used any one of the nonionic, anionic or cationic surfactant. It is, however, desired to use the nonionic surfactant since it dissolves in the polymerizable monomer. Concrete examples of the nonionic surfactant that can be preferably used include sorbitan fatty acid ester, glycerin fatty acid ester, decaglycerin fatty acid ester, propylene glycol/pentaerythritol fatty acid ester, polyoxyethylene sorbitan fatty acid ester, polyoxyethylene sorbit fatty acid ester, polyoxyethylene glycerin fatty acid ester, polyethylene glycol fatty acid ester, polyoxyethylenealkyl ether, polyoxyethylene phytosterol/phytostanol, polyoxyethylenepolyoxypropylenealkyl ether, polyoxyethylenealkylphenyl ether, polyoxyethylene castor oil/cured castor oil, polyoxyethylenelanolin/lanolin alcohol/bees wax derivative, polyoxyethylenealkylamine/fatty acid amide, polyoxyethylenealkylphenylformaldehyde condensate, and single-chain polyoxyethylenealkyl ether. The surfactants may be used in two or more kinds being mixed together. It is desired that the surfactant is added in an amount of from 0.1 to 20 parts by weight per the whole amount of radically polymerizable monomers of 100 parts by weight.

As the antioxidant, radical-trapping agent, ultraviolet-ray stabilizer and ultraviolet-ray absorber, there can be preferably used hindered amine photostabilizer, hindered phenol antioxidant, phenolic radical-trapping agent, sulfur-containing antioxidant, benzotriazole compound, and benzophenone compound. These antioxidant, radical-trapping agent, ultraviolet-ray stabilizer and ultraviolet-ray absorber may be used in two or more kinds in combination. In using these nonpolymerizable compounds, further, the surfactant may be used in combination with the antioxidant, radical-trapping agent, ultraviolet-ray stabilizer and ultraviolet-ray absorber. It is desired that these antioxidant, radical-trapping agent, ultraviolet-ray stabilizer and ultraviolet-ray absorber are added in amounts over a range of from 0.001 to 1 part by weight per 100 parts by weight of the whole radically polymerizable monomers.

There is no particular limitation on the method of preparing the curable composition of the present invention; i.e., predetermined amounts of components are weighed and mixed together. There is no particular limitation on the order of adding the components. All components may be simultaneously added, or the monomer components only may be mixed in advance and, then, the photochromic compounds and other additives may be added thereto just prior to the polymerization as will be described later. In conducting the polymerization, a polymerization initiator may further be added, as required, as will be described later.

There is no particular limitation on the method of obtaining the photochromic cured product of the present invention by curing the curable composition of the present invention, and any known polymerization method can be employed depending upon the kind of the monomer that is used. Means for initiating the polymerization is conducted by using various peroxides or a radical polymerization initiator such as an azo compound, or by the irradiation with ultraviolet rays, α-rays, β-rays or γ-rays, or by the use of the two in combination.

There is no particular limitation on the polymerization method. From the standpoint of use as optical materials such as photochromic lenses, however, it is desired to conduct the cast polymerization. A typical cast polymerization method will now be described in detail.

According to this method, the curable composition of the present invention to which the radical polymerization initiator has been added is poured into between the molds that are held by an elastomer gasket or by a spacer, and is heated in an air oven so as to be cured by polymerization, and the cured product is taken out.

There is no particular limitation on the radical polymerization initiator, and any known one can be used. Representative examples include diacyl peroxides such as benzoyl peroxide, p-chlorobenzoyl peroxide, decanoyl peroxide, lauroyl peroxide and acetyl peroxide; peroxy esters such as t-butylperoxy-2-ethyl hexanoate, t-butylperoxy dicarbonate, cumylperoxy neodecanoate, and t-butylperoxy benzoate; percarbonates such as diisopropylperoxy dicarbonate, di-2-ethylhexylperoxy dicarbonate and di-sec-butyloxy carbonate; and azo compounds such as 2,2'-azobisisobutylonitrile, 2,2'-azobis(4-dimethylvalenonitrile), 2,2'-azobis(2-methylbutylonitrile) and 1,1'-azobis(cyclohexane-1-carbonitrile).

The amount of the radical polymerization initiator that is used varies depending upon the polymerization conditions, kind of the initiator, kind and composition of the curable composition of the invention, and cannot be exclusively defined, but is, generally, in a range of from 0.01 to 10 parts by weight per 100 parts by weight of the whole radically polymerizable monomers.

Among the polymerization conditions, temperature particularly affects the properties of the resin that is obtained. The temperature conditions are affected by the kind and amount of the initiator and by the kind of the monomer, and cannot be exclusively determined. In general, however, it is desired to conduct the polymerization in two steps in a so-called tapered manner by starting the polymerization at a relatively low temperature, slowly raising the temperature, and conducting the curing at a high temperature at the end of the polymerization.

Like the temperature, the polymerization time, too, varies depending upon a variety of factors, and it is desired to determine an optimum time in advance depending upon these conditions. Generally, however, it is desired to so select the conditions that the polymerization is completed in 2 to 40 hours.

The cast polymerization can similarly be carried out even by a known photopolymerization method by using ultraviolet rays. In this case, the photopolymerization initiator may be benzoin, benzoinmethyl ether, benzoinbutyl ether, benzophenol, acetophenone 4,4'-dichlorobenzophenone, diethoxyacetophenone, 2-hydroxy-2-methyl-1-phenylpropane-1-one, benzylmethyl ketal, 1-(4-isopropylphenyl)-2-hydroxy-2-methylpropane-1-one, 1-hydroxycyclohexylphenyl ketone and 2-isopropylthioxanthone. In general, these photopolymerization initiators are used in a range of from 0.001 to 5 parts by weight per 100 parts by weight of the whole radically polymerizable monomers.

The cured product of the invention obtained by the above-mentioned method can be treated as described below depending upon the use. That is, dying by using a dye such as dispersion dye; coating with a hard coating agent comprising chiefly a silane coupling agent or a sol of an oxide of silicon, zirconium, antimony or aluminum, or with a hard coating agent comprising chiefly an organic high-molecular material; reflection-preventing treatment by the deposition of a thin film of a metal oxide such as $SiO_2$, $TiO_2$ or $ZrO_2$, or by the application with a thin film of an organic high-molecular material; or the working such as antistatic treatment and the secondary treatment.

EXAMPLES

The invention will now be described in further detail by way of Examples to which only, however, the invention is in no way limited.

The compounds used in the following examples are as described below.

(1) Allyl ether or allylthio ether compounds.

ALMePE (550): Methoxypolyethylene glycol allyl ether having an average molecular weight of 550.

ALBuPEPPG (1600): Butoxypolyethylene glycol polypropylene glycol allyl ether having an average molecular weight of 1600.

ALMAPEG (430): Methacryloxypolyethylene glycol allyl ether having an average molecular weight of 430.
ALAPEG (420): Acryloxypolyethylene glycol allyl ether having an average molecular weight of 420.
ALMAPEPPG (560): Methacryloxypolyethylene glycol-polypropylene glycol allyl ether having an average molecular weight of 560.
ALSMePEG (730): Methoxypolyethylenethio glycol allylthio ether having an average molecular weight of 730.
(2) Other radically polymerizable monomers.

Rockwell hardnesses on the L-scale of the polymers obtained by homopolymerizing substantially the whole amount of the fed monomers by the cast polymerization are shown below (simply abbreviated as "homo-HL" (measuring method is as described in the photochromatic properties ④ described later)).
TMPT: Trimethylolpropane trimethacrylate (homo-HL=122).
DPEHA: Dipentaerythritol hexaacrylate (homo-H1=100).
EB6A: Polyester oligomer hexaacrylate (homo-HL=100).
CDPEHA: Caprolactone-modified dipentaerythritol hexaacrylate (homo-HL=100).
4G: Tetraethylene glycol dimethacrylate (homo-HL=90).
9GDA: Polyethylene glycol diacrylate having an average molecular weight of 532 (homo-HL<40).
3GDA: Triethylene glycol diacrylate (homo-HL<40).
MePEG (1000): Methyl ether polyethylene glycol methacrylate having an average molecular weight of 1000 (homo-HL<20).
SR9036: Ethylene oxide-isopropylidenediphenolbis methacrylate having an average ethylene oxide addition number of 30 (homo-HL<40).
BPE: 2,2-Bis(4-methacryloyloxyethoxyphenyl)propane (homo-HL=110).
GMA: Glycidyl methacrylate.
αMS: α-Methylstyrene.
MSD: α-Methylstyrene dimer.
3S4G: Bis(2-methacryloyloxyethylthioethyl)sulfide (homo-HL=100).
2S2G: 1,2-Bis(methacryloylthio)ethane (homo-HL=100).
(3) Photochromic Compounds.

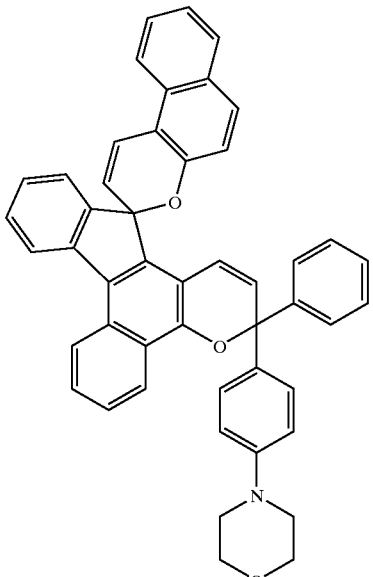

(XXXII)

Chromene 2

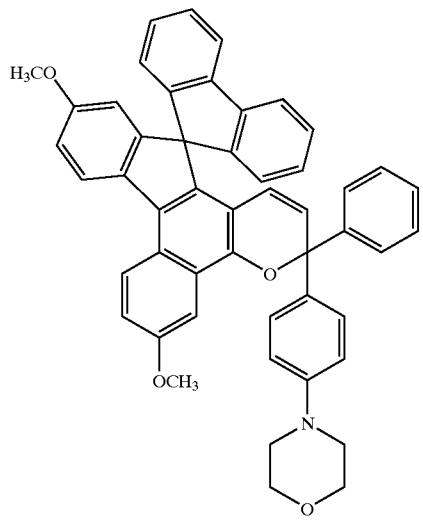

(XXXIII)

Chromene 3

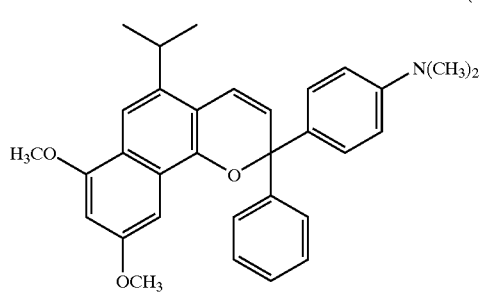

(XXXIV)

Chromene 4

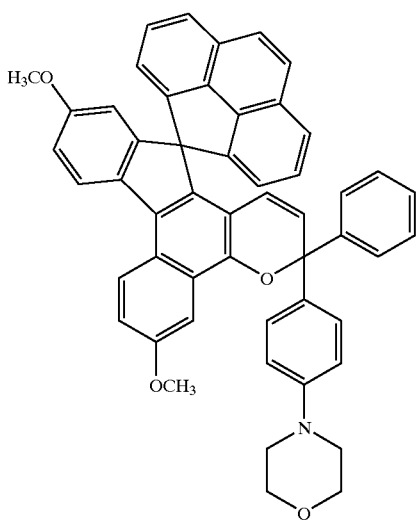

(XXXI)

Chromene 1

(XXXV)

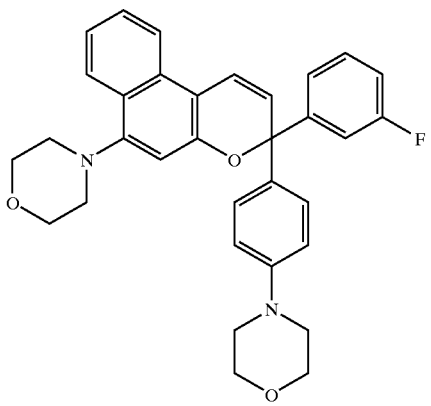

Chromene 5

(XXXVI)

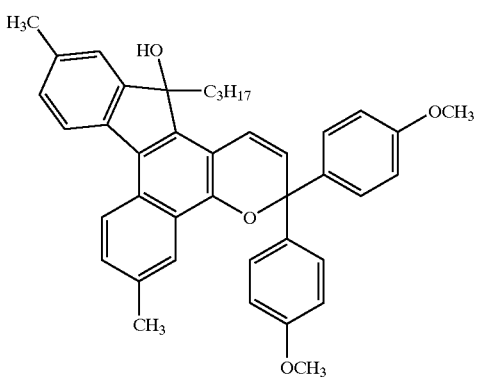

Chromene 6

(XXXVII)

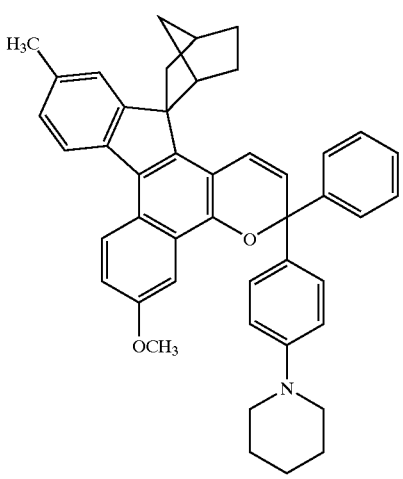

Chromene 7

(5) Polymerization initiators.

ND: t-Butylperoxy neodecanoate (trade name: Perbutyl ND, manufactured by Nihon Yushi Co.).

Octa O: 1,1,3,3-Tetramethylbutylperoxy-2-ethylhexanoate (trade name: Perocta O, manufactured by Nihon Yushi Co.).

Example 1

0.03 Parts by weight of the chromene 1 and 1 part by weight of the Perbutyl ND as a polymerization initiator were added to 100 parts by weight of the polymerizable monomers comprising 40 parts by weight of a 2,2-bis(4-methacryloyloxyethoxyphenyl)propane, 59.9 parts by weight of a tetraethylene glycol dimethacrylate and 0.1 part by weight of the ALMePEG (550), and were mixed together to a sufficient degree. The mixed solution was poured into a mold constituted by a glass plate and a gasket of an ethylene-vinyl acetate copolymer to conduct the cast polymerization. The polymerization was conducted by using an air furnace, gradually raising the temperature from 30° C. to 90° C. over 18 hours and, then, maintaining the temperature at 90° C. for 2 hours. After the polymerization, the polymer was taken out from the mold of the glass. The thus obtained polymer sample (2 mm thick) was irradiated with light by using a xenon lamp L-2480 (300 W) SHL-100 manufactured by Hamamatsu Photonics Co. through an aeromass filter (manufactured by Coning Co.) at 20° C.±1° C. at beam intensities on the polymer surface of 365 nm=2.4 mW/cm$^2$ and 245 nm=24 μW/cm$^2$ for 120 seconds to develop color and to measure the photochromic properties. The photochromic properties were evaluated by the following methods.

① Maximum absorption wavelength (λmax): A maximum absorption wavelength after the development of color as found by using a spectrophotometer (instantaneous multi-channel photodetector MCPD 1000) manufactured by Otsuka Denshi Co. The maximum absorption wavelength is related to the color tone at the time when the color is developed.

② Color density {ε(120)−ε(0)}: A difference between an absorbency {ε(120)} after irradiated with light for 120 seconds at the maximum absorption wavelength and ε(0). It can be said that the higher this value, the more excellent the photochromic properties are.

③ Fading rate [t1/2 (min)]: The time until the absorbency of a sample at the maximum wavelength drops down to one-half the {ε(120)−(0) } from when the sample is no longer irradiated with light after it was irradiated with light for 120 seconds. It can be said that the shorter the time, the more excellent the photochromic properties are.

④ Light resistance (%)={($A_{200}/A_0$)×100}: The following deterioration promotion testing was conducted in order to evaluate the light resistance of color developed by the irradiation with light. That is, the obtained polymer (sample) was deteriorated by using a xenon weather meter X25 manufactured by Suga Shikenki Co. for 200 hours. Thereafter, the color densities were evaluated before and after the testing; i.e., a color density ($A_0$) before the testing and a color density ($A_{200}$) after the testing were measured, and a value {($A_{200}/A_0$)×100} was calculated as a remaining factor (%) to use it as an index of resistance of the developed color. The higher the remaining factor, the higher the resistance of the developed color.

Further, the properties of the base material were evaluated concerning the following items.

⑤ L-scale Rockwell hardness (HL): After left to stand in a room maintained at 25° C. for one day, the cured product was measured for its L-scale Rockwell hardness by using the Akashi Rockwell hardness meter (model, AR-10).

⑥ Shock resistance: A steel ball was permitted to naturally fall on a test plate having a thickness of 2 mm and a diameter of 65 mm from a height of 127 cm, and the shock resistance was evaluated in terms of the weight of the steel ball by which the test plate was broken. The basis of evaluation was such that "1" was when the weight of the steel ball at this moment was smaller than 20 g, "2" was when the weight was 20 to 40 g, "3" was when the weight was 40 to 60 g, "4" was when the weight was 60 to 80 g, and "5" was when the weight was not smaller than 80 g.

⑦ Heat resistance: The molded and cured product was fitted to the frame and was heated at 120° C. ○ represents the case when the frame was not deviated, and X represents the case when the frame was deviated.

The results were as shown in Tables 1 and 2.

Examples 2 to 27

Photochromic cured products were obtained in the same manner as in Example 1 but using polymerizable monomer compositions, chromene compounds and other additives

TABLE 1

| Example No. | Allyl ether or allylthio ether compounds (% by mass) | | Radically polymerizable monomers (% by mass) | | Polymerization initiator (parts)*1 | |
|---|---|---|---|---|---|---|
| 1 | ALMePEG(550) | 0.1 | BPE/4G | 40/59.9 | ND | 1 |
| 2 | ALMePEG(550) | 0.5 | BPE/4G | 40/59.5 | ND | 1 |
| 3 | ALMePEG(550) | 2 | BPE/4G | 40/58 | ND | 1 |
| 4 | ALMePEG(550) | 5 | BPE/4G | 40/55 | ND | 1 |
| 5 | ALMePFG(550) | 10 | BPE/4G | 40/50 | ND | 1 |
| 6 | ALMePEG(550) | 2 | TMPT/4G/GMA/αMS/MSD | 20/65/7/5/1 | ND | 1 |
| 7 | ALMePEG(550) | 3 | BPE/TMPT/4G/GMA/αMS/MSD | 45/20/12/9/8/3 | ND/OctaO | 0.7/0.1 |
| 8 | ALMePEG(550) | 2 | TMPT/4G/9GDA/GMA/αMS/MSD | 20/60/5/7/5/1 | ND | 1 |
| 9 | ALBuPEPPG(1600) | 0.7 | 4G/GMA | 65/34.3 | ND | 1 |
| 10 | ALBuPEPPG(1600) | 0.05 | 4G/GMA | 65/34.95 | ND | 1 |
| 11 | ALMePEG(550) | 5 | BPE/4G/GMA | 45/35/10 | ND | 1 |
| 12 | ALMePEG(550) | 2 | TMPT/4G/3GDA/GMA/αMS/MSD | 20/60/5/7/5/1 | ND | 1 |
| 13 | ALMAPEG(430) | 5 | BPE/4G | 40/55 | ND | 1 |
| 14 | ALAPEG(420) | 5 | BPE/4G | 40/55 | ND | 1 |
| 15 | ALMAPEPPG(560) | 5 | BPE/4G | 40/55 | ND | 1 |
| 16 | ALSMePEG(730) | 5 | BPE/4G | 40/55 | ND | 1 |
| 17 | ALMePEG(550) | 5 | BPE/4G | 40/55 | ND | 1 |
| 18 | ALMePEG(550) | 5 | BPE/4G | 40/55 | ND | 1 |
| 19 | ALMePEG(550) | 5 | BPE/4G | 40/55 | ND | 1 |
| 20 | ALMePEG(550) | 5 | BPE/4G | 40/55 | ND | 1 |
| 21 | ALMePEG(550) | 5 | BPE/4G | 40/55 | ND | 1 |
| 22 | ALMePEG(550) | 5 | BPE/4G | 40/55 | ND | 1 |
| 23 | ALMePEG(550) | 2 | 3S4G/TMPT/GMA/4G | 80/5/5/8 | ND | 1 |
| 24 | ALMePEG(550) | 2 | 2S2G/TMPT/GMA/4G | 80/5/5/8 | ND | 1 |
| 25 | ALMePEG(550) | 3 | BPE/DPEHA/4G/GMA/αMS/MSD | 45/20/12/9/8/3 | ND/OctaO | 0.7/0.1 |
| 26 | ALMePEG(550) | 3 | BPE/CDPEHA/4G/GMA/αMS/MSD | 45/20/12/9/8/3 | ND/OctaO | 0.7/0.2 |
| 27 | ALMePEG(550) | 3 | BPE/EB6A/4G/GMA/αMS/MSD | 45/20/12/9/8/3 | ND/OctaO | 0.7/0.1 |

*1Parts by weight per 100 parts by weight of the whole radically polymerizable monomers.

TABLE 2

| Example No. | Chromene Compounds (Parts)*2 | | λmax (nm) | Color density | Fading rate (min) | Light resistance (%) | HL hardness | Heat resistance | Shock resistance |
|---|---|---|---|---|---|---|---|---|---|
| 1 | Chromene 1 | 0.03 | 610 | 0.6 | 3 | 72 | 96 | ○ | 4 |
| 2 | Chromene 1 | 0.03 | 610 | 0.7 | 2.4 | 72 | 95 | ○ | 4 |
| 3 | Chromene 1 | 0.03 | 610 | 0.8 | 2 | 72 | 90 | ○ | 4 |
| 4 | Chromene 1 | 0.03 | 610 | 0.85 | 1.5 | 72 | 86 | ○ | 4 |
| 5 | Chromene 1 | 0.03 | 610 | 0.9 | 1 | 71 | 80 | ○ | 4 |
| 6 | Chromene 1 | 0.03 | 610 | 0.88 | 0.7 | 88 | 95 | ○ | 4 |
| 7 | Chromene 1 | 0.03 | 610 | 0.9 | 0.68 | 86 | 100 | ○ | 5 |
| 8 | Chromene 1 | 0.03 | 610 | 0.85 | 0.6 | 90 | 90 | ○ | 4 |
| 9 | Chromene 1 | 0.03 | 610 | 0.72 | 1.7 | 85 | 94 | ○ | 3 |
| 10 | Chromene 1 | 0.03 | 610 | 0.76 | 2.8 | 85 | 85 | ○ | 4 |
| 11 | Chromene 1 | 0.03 | 610 | 0.9 | 1.2 | 88 | 86 | ○ | 4 |
| 12 | Chromene 1/chromene 5 0.03/0.02 | | 484 600 | 0.8 0.8 | 0.6 0.6 | 88 89 | 86 | ○ | 4 |
| 13 | Chromene 1 | 0.03 | 610 | 0.9 | 0.9 | 72 | 80 | ○ | 4 |
| 14 | Chromene 1 | 0.03 | 610 | 0.95 | 0.8 | 72 | 80 | ○ | 4 |
| 15 | Chromene 1 | 0.03 | 610 | 0.88 | 0.95 | 72 | 82 | ○ | 4 |
| 16 | Chromene 1 | 0.03 | 615 | 0.8 | 1.4 | 71 | 86 | ○ | 4 |
| 17 | Chromene 2 | 0.03 | 580 | 0.78 | 1.6 | 65 | 86 | ○ | 4 |
| 18 | Chromene 3 | 0.03 | 600 | 0.75 | 2.2 | 70 | 86 | ○ | 4 |
| 19 | Chromene 4 | 0.03 | 588 | 0.7 | 3 | 60 | 86 | ○ | 4 |
| 20 | Chromene 5 | 0.03 | 474 | 0.9 | 1.3 | 70 | 86 | ○ | 4 |
| 21 | Chromene 6 | 0.03 | 576 | 0.9 | 1.8 | 65 | 86 | ○ | 4 |
| 22 | Chromene 7 | 0.03 | 570 | 0.92 | 1 | 72 | 86 | ○ | 4 |
| 23 | Chromene 1 | 0.03 | 612 | 0.92 | 1 | 80 | 90 | ○ | 4 |
| 24 | Chromene 1 | 0.03 | 612 | 0.92 | 1.5 | 80 | 92 | ○ | 4 |
| 25 | Chromene 1 | 0.03 | 610 | 0.94 | 0.65 | 86 | 100 | ○ | 5 |
| 26 | Chromene 1 | 0.03 | 610 | 0.98 | 0.62 | 86 | 96 | ○ | 5 |
| 27 | Chromene 1 | 0.03 | 610 | 0.92 | 0.64 | 86 | 102 | ○ | 5 |

*2Parts by weight per 100 parts by weight of the whole radically polymerizable monomers.

shown in Tables 1 and 2, and were evaluated for their properties. The results were as shown in Tables 1 and 2.

Comparative Examples 1 to 12

For the purpose of comparison, photochromic cured products were obtained in the same manner as in Example 1 but using polymerizable monomer compositions and chromene compounds shown in Tables 3 and 4, and were evaluated for their properties. The results were as shown in Tables 3 and 4.

TABLE 3

| Comparative Example No. | Allyl ether or allylthio ether compounds (% by mass) | Radically polymerizable monomers (% by mass) | | Polymerization initiator (parts)*1 | |
| --- | --- | --- | --- | --- | --- |
| 1 | — | BPE/4G | 40/60 | ND | 1 |
| 2 | — | BPE/4G | 40/60 | ND | 1 |
| 3 | — | BPE/4G | 40/60 | ND | 1 |
| 4 | — | BPE/4G | 40/60 | ND | 1 |
| 5 | — | BPE/4G | 40/60 | ND | 1 |
| 6 | — | BPE/4G | 40/60 | ND | 1 |
| 7 | — | BPE/4G | 40/60 | ND | 1 |
| 8 | — | BPE/4G/MePEG(1000) | 40/50/10 | ND | 1 |
| 9 | — | BPE/4G/M90G | 40/58/2 | ND | 1 |
| 10 | — | BPE/SR9036 | 60/40 | ND | 1 |
| 11 | — | BPE/4G/M90G | 40/58/2 | ND | 1 |
| 12 | — | BPE/SR9036 | 60/40 | ND | 1 |

*1Parts by weight per 100 parts by weight of the whole radically polymerizable monomers.

TABLE 4

| Comparative Example No. | Chromene Compounds (Parts)*2 | | λmax (nm) | Color density | Fading rate (min) | Light resistance (%) | HL hardness | Heat resistance | Shock resistance |
| --- | --- | --- | --- | --- | --- | --- | --- | --- | --- |
| 1 | Chromene 1 | 0.03 | 610 | 0.4 | 5.3 | 70 | 95 | ○ | 4 |
| 2 | Chromene 2 | 0.05 | 584 | 0.3 | 6 | 68 | 95 | ○ | 4 |
| 3 | Chromene 3 | 0.05 | 600 | 0.35 | 6.5 | 70 | 95 | ○ | 4 |
| 4 | Chromene 4 | 0.05 | 588 | 0.5 | 8 | 60 | 95 | ○ | 4 |
| 5 | Chromene 5 | 0.03 | 474 | 0.7 | 4 | 70 | 95 | ○ | 4 |
| 6 | Chromene 6 | 0.03 | 576 | 0.3 | 5 | 65 | 95 | ○ | 4 |
| 7 | Chromene 7 | 0.03 | 570 | 0.4 | 5 | 70 | 95 | ○ | 4 |
| 8 | Chromene 1 | 0.03 | 610 | 0.8 | 1.5 | 70 | 50 | X | 2 |
| 9 | Chromene 1 | 0.03 | 610 | 0.5 | 4 | 70 | 80 | ○ | 4 |
| 10 | Chromene 1 | 0.03 | 610 | 0.8 | 1.5 | 70 | 30 | X | 2 |
| 11 | Chromene 1 | 0.03 | 610 | 0.5 | 4 | 70 | 80 | ○ | 4 |
| 12 | Chromene 1 | 0.03 | 610 | 0.8 | 1.5 | 70 | 30 | X | 2 |

*2Parts by weight per 100 parts by weight of the whole radically polymerizable monomers.

As described above, the base material obtained from a polymerizable monomer without containing an allyl ether or allylthio ether compound exhibits practicable heat resistance but is not really practically usable because of its small fading rate which is one of the photochromic properties. These properties, i.e., photochromic properties and base material properties are satisfied by a combination of the allyl ether or allylthio ether compound and the radically polymerizable monomers. Photochromic cured products of Examples 1 to 27 of the present invention exhibit well-balanced photochromic properties such as color density, fading rate and hardness, as well as shock resistance and heat resistance which are properties of the base member, which are superior to those of Comparative Examples 1 to 12.

Industrial Applicability

The photochromic cured product of the present invention obtained by curing the curable composition exhibits excellent photochromic properties such as a high color density and a large fading rate, and exhibits excellent base material properties such as a high hardness, a high heat resistance and a high shock resistance.

Therefore, the cured product obtained from the curable composition of the present invention is very useful as an optical material such as a photochromic lens material.

What is claimed is:

1. A curable composition comprising:

(A) an allyl ether or allylthio ether compound represented by the following general formula (1),

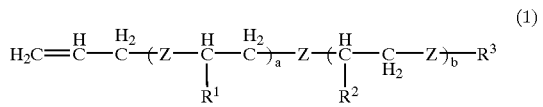

wherein $R^1$ and $R^2$ are, independently from each other, hydrogen atoms or alkyl groups, $R^3$ is an alkyl group, an acyl group, an acryloyl group, a methacryloyl group, a vinyl group or a styryl group, Z is an oxygen atom or a sulfur atom, and a and b are, independently from each other, from 0 to 20 in average, a+b being from 3 to 20;

(B) a radically polymerizable monomer other than (A) above; and (C) a photochromic compound.

2. The curable composition according to claim 1, wherein the photochromic compound (C) has a molecular weight of not smaller than 540.

3. The curable composition according to claim 1, wherein the photochromic compound is represented by the following general formula (10),

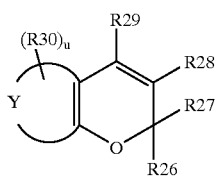
(10)

wherein a group represented by the following formula (VIII)

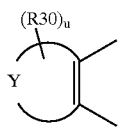
(VIII)

is a substituted or unsubstituted aromatic hydrocarbon group, or a substituted or unsubstituted unsaturated heterocyclic group, $R^{28}$, $R^{29}$ and $R^{30}$ are alkyl groups, alkoxy groups, aralkoxy groups, amino groups, substituted amino groups, cyano groups, substituted or unsubstituted aryl groups, halogen atoms, aralkyl groups, hydroxy groups, substituted or unsubstituted alkenyl groups, substituted or unsubstituted heterocyclic groups having a nitrogen atom as a hetero atom and in which the nitrogen atom is bonded to a pyran ring or to a ring of a group represented by the above formula (10), or condensed heterocyclic groups in which the hetercyclic group is condensed with an aromatic hydrocarbon ring or an aromatic heterocyclic ring, u is an integer of 0 to 6, and $R^{26}$ and $R^{27}$ are, independently from each other, groups represented by the following formula (IX),

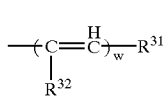
(IX)

wherein $R^{31}$ is a substituted or unsubstituted aryl group, or a substituted unsubstituted heteroaryl group, $R^{32}$ is a hydrogen atom, an alkyl group or a halogen atom, and W is an integer of 1 to 3,
groups represented by the following formula (X),

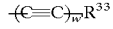
(X)

wherein $R^{33}$ is a substituted or unsubstituted aryl group, or a substituted or unsubstituted heteroaryl group, and w' is an integer of 1 to 3,
substituted or unsubstituted aryl groups, substituted or unsubstituted heteroaryl groups, or alkyl groups, or $R^{26}$ and $R^{27}$ together may constitute an aliphatic hydrocarbon ring or an aromatic hydrocarbon ring.

4. The curable composition according to claim 1, wherein the radically polymerizable monomer (B) other than (A) contains a bifunctional or polyfunctional polymerizable monomer which exhibits an L-scale Rockwell hardness of not smaller than 60 when it is homopolymerized to form a polymer.

5. The curable composition according to claim 1, wherein the radically polymerizable monomer (B) other than (A) is a polyfunctional polymerizable monomer which exhibits an L-scale Rockwell hardness of not smaller than 60 when it is homopolymerized to form a polymer, and is represented by the following general formula (2),

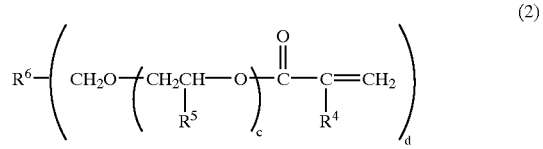
(2)

wherein $R^4$ and $R^5$ are, independently from each other, hydrogen atoms or alkyl groups having 1 to 2 carbon atoms (or methyl groups or ethyl groups), $R^4$ is an organic residue having a valency of 3 to 6, c is from 0 to 3 in average, and d is an integer of from 3 to 6.

6. The curable composition according to claim 1, wherein the radically polymerizable monomer(B) other than (A) is a bifunctional polymerizable monomer which exhibits an L-scale Rockwell hardness of not smaller than 60 when it is homopolymerized to form a polymer, and is at least one compound selected from the group consisting of a compound represented by the following general formula (3),

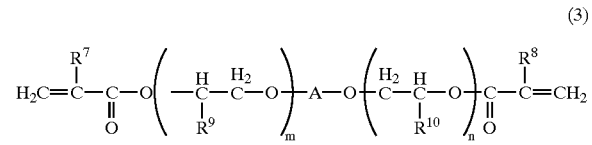
(3)

wherein $R^7$ and $R^8$ are methyl groups, $R^9$ and $R^{10}$ are, independently from each other, hydrogen atoms or alkyl groups having 1 to 2 carbon atoms, and A is a straight-chain or branched alkylene group, a substituted or unsubstituted phenylene group, a group represented by the following formula (I),

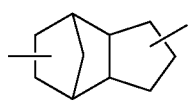
(I)

or a group represented by the following formula (II),

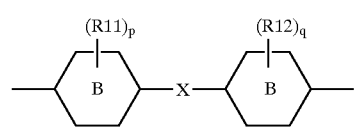
(II)

wherein $R^{11}$ and $R^{12}$ are, independently from each other, alkyl groups having 1 to 4 carbon atoms, chlorine atoms or bromine atoms, p and q are, independently from each other, integers of from 0 to 4, a ring represented by the following formula (III),

(III)

is a benzene ring or a cyclohexane ring, and when the ring (III) is a benzene ring, X is any one of the groups represented by the following formulas (IV)

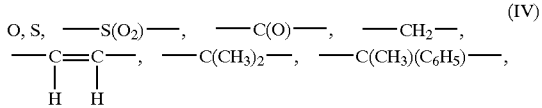

or is a group represented by the following formula (V)

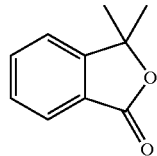

and when the ring (III) is a cyclohexane ring, X is any one of the groups represented by the following formulas (VI)

O, S, —CH$_2$—, —C(CH$_3$)$_2$—, (VI)

and m and n are not smaller than 1, respectively, m+n being from 2 to 6 in average, a compound represented by the following formula (4),

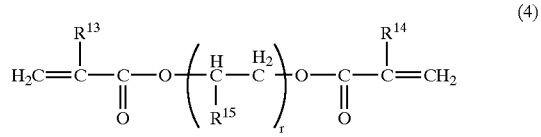

wherein $R^{13}$ and $R^{14}$ are methyl groups, $R^{15}$ is a hydrogen atom or an alkyl group having 1 to 2 carbon atoms, and r is from 1 to 6 in average, a compound represented by the following formula (5),

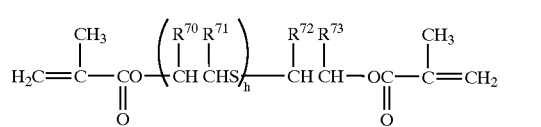

wherein $R^{70}$, $R^{71}$, $R^{72}$ and $R^{73}$ may be the same or different, and are hydrogen atoms or methyl groups, and h is an integer of from 1 to 10, and a compound represented by the following formula (6),

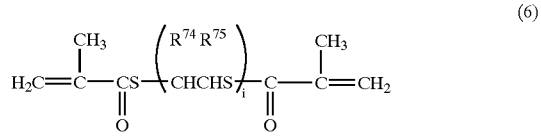

wherein $R^{74}$ and $R^{75}$ may be the same or different, and are hydrogen atoms or methyl groups, and i is an integer of from 1 to 10.

7. The curable composition according to claim 1, wherein there are used in combination a bifunctional polymerizable monomer which exhibits an L-scale Rockwell hardness of not smaller than 60 when it is homopolymerized to form a polymer and a polyfunctional polymerizable monomer which exhibits an L-scale Rockwell hardness of not smaller than 60 when it is homopolymerized to form a polymer.

8. The curable composition according to claim 1 wherein the content of component (A) is from 0.001 to 30% by mass and the content of the component (B) is from 99.999 to 70% by mass on the basis of the total amount of the component (A) and the component (B).

9. The curable composition according to claim 1, wherein the photochromic compound (C) is contained in an amount of from 0.001 to 5 parts by weight per 100 parts by weight of the whole polymerizable monomers.

10. A photochromic cured product obtained by curing the curable composition of claim 1.

11. The photochromic cured product of claim 10 which is formed as a lens.

12. The photochromic cured product of claim 10 which is a coating layer of a lens.

13. A curable composition according to claim 1, wherein in the allyl ether or allylthio ether compound represented by the general formula (1), $R^1$ and $R^2$ are hydrogen atoms or alkyl groups having 1 to 2 carbon atoms, $R^3$ is an alkyl group having 1 to 2 carbon atoms or an acyl group having 2 to 10 carbon atoms, and a and b are, independently from each other, from 0 to 10 in average, a+b being from 4 to 12.

14. The curable composition according to claim 13 wherein the photochromic compound (C) has a molecular weight of not smaller than 540.

15. The curable composition according to claim 14, wherein the photochromic compound is represented by the following general formula (10),

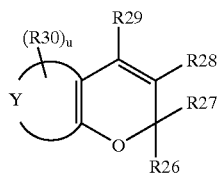

wherein a group represented by the following formula (VIII)

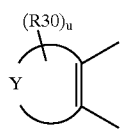

is a substituted or unsubstituted aromatic hydrocarbon group, or a substituted or unsubstituted unsaturated heterocyclic group, $R^{28}$, $R^{29}$ and $R^{30}$ are alkyl groups, alkoxy groups, aralkoxy groups, amino groups, substituted amino groups, cyano groups, substituted or unsubstituted aryl groups, halogen atoms, aralkyl groups, hydroxy groups, substituted or unsubstituted alkenyl groups, substituted or unsubstituted heterocyclic groups having a nitrogen atom as a hetero atom and in which the nitrogen atom is bonded to a pyran ring or to a ring of a group represented by the above formula (10), or condensed heterocyclic groups in which the hetercyclic group is condensed with an aromatic hydrocarbon ring or an aromatic heterocyclic ring, u is an integer of 0 to 6, and $R^{26}$ and $R^{27}$ are, independently from each other, groups represented by the following formula (IX),

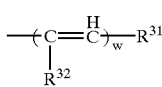 (IX)

wherein $R^{31}$ is a substituted or unsubstituted aryl group, or a substituted unsubstituted heteroaryl group, $R^{32}$ is a hydrogen atom, an alkyl group or a halogen atom, and W is an integer of 1 to 3,
groups represented by the following formula (X),

 (X)

wherein $R^{33}$ is a substituted or unsubstituted aryl group, or a substituted or unsubstituted heteroaryl group, and w' is an integer of 1 to 3,
substituted or unsubstituted aryl groups, substituted or unsubstituted heteroaryl groups, or alkyl groups, or $R^{26}$ and $R^{27}$ together may constitute an aliphatic hydrocarbon ring or an aromatic hydrocarbon ring.

16. The curable composition according to claim 15, wherein the radically polymerizable monomer (B) other than (A) contains a bifunctional or polyfunctional polymerizable monomer which exhibits an L-scale Rockwell hardness of not smaller than 60 when it is homopolymerized to form a polymer.

17. The curable composition according to claim 16, wherein the radically polymerizable monomer (B) other than (A) is a polyfunctional polymerizable monomer which exhibits an L-scale Rockwell hardness of not smaller than 60 when it is homopolymerized to form a polymer, and is represented by the following general formula (2),

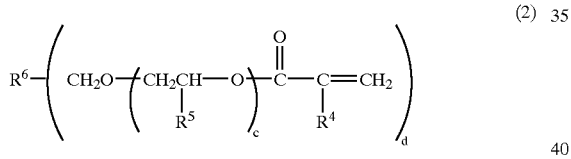 (2)

wherein $R^4$ and $R^5$ are, independently from each other, hydrogen atoms or alkyl groups having 1 to 2 carbon atoms (or methyl groups or ethyl groups), $R^6$ is an organic residue having a valency of 3 to 6, c is from 0 to 3 in average, and d is an integer of from 3 to 6.

18. The curable composition according to claim 17, wherein the radically polymerizable monomer(B) other than (A) is a bifunctional polymerizable monomer which exhibits an L-scale Rockwell hardness of not smaller than 60 when it is homopolymerized to form a polymer, and is at least one compound selected from the group consisting of a compound represented by the following general formula (3),

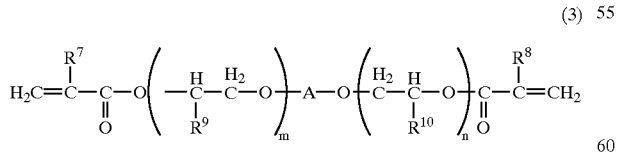 (3)

wherein $R^7$ and $R^8$ are methyl groups, $R^9$ and $R^{10}$ are, independently from each other, hydrogen atoms or alkyl groups having 1 to 2 carbon atoms, and A is a straight-chain or branched alkylene group, a substituted or unsubstituted phenylene group, a group represented by the following formula (I),

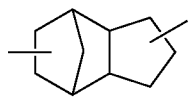 (I)

or a group represented by the following formula (II),

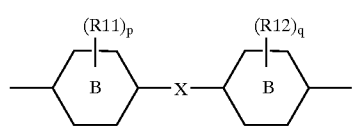 (II)

wherein $R^{11}$ and $R^{12}$ are, independently from each other, alkyl groups having 1 to 4 carbon atoms, chlorine atoms or bromine atoms, p and q are, independently from each other, integers of from 0 to 4, a ring represented by the following formula (III),

 (III)

is a benzene ring or a cyclohexane ring, and when the ring (III) is a benzene ring, X is any one of the groups represented by the following formulas (IV)

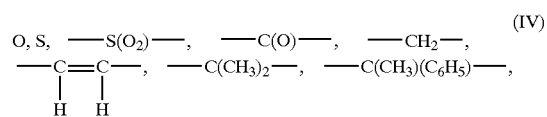 (IV)

or is a group represented by the following formula (V)

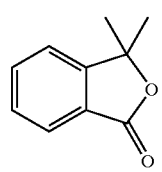 (V)

and when the ring (III) is a cyclohexane ring, X is any one of the groups represented by the following formulas (VI)

 (VI)

and m and n are not smaller than 1, respectively, m+n being from 2 to 6 in average,
a compound represented by the following formula (4),

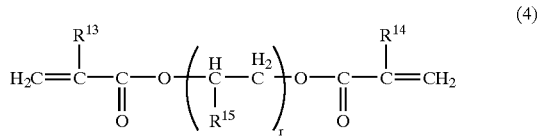 (4)

wherein $R^{13}$ and $R^{14}$ are methyl groups, $R^{15}$ is a hydrogen atom or an alkyl group having 1 to 2 carbon atoms, and r is from 1 to 6 in average, a compound represented by the following formula (5),

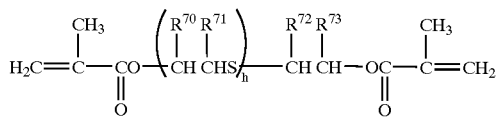

(5)

wherein $R^{70}$, $R^{71}$, $R^{72}$ and $R^{73}$ may be the same or different, and are hydrogen atoms or methyl groups, and h is an integer of from 1 to 10, and a compound represented by the following formula (6),

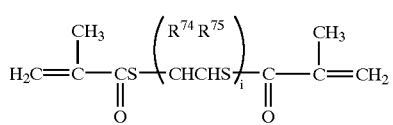

(6)

wherein $R^{74}$ and $R^{75}$ may be the same or different, and are hydrogen atoms or methyl groups, and i is an integer of from 1 to 10.

19. The curable composition according to claim 18, wherein there are used in combination a bifunctional polymerizable monomer which exhibits an L-scale Rockwell hardness of not smaller than 60 when it is homopolymerized to form a polymer and a polyfunctional polymerizable monomer which exhibits an L-scale Rockwell hardness of not smaller than 60 when it is homopolymerized to form a polymer.

20. The curable composition according to claim 19 wherein the content of component (A) is from 0.001 to 30% by mass and the content of the component (B) is from 99.999 to 70% by mass on the basis of the total amount of the component (A) and the component (B).

21. The curable composition according to claim 20, wherein the photochromic compound (C) is contained in an amount of from 0.001 to 5 parts by weight per 100 parts by weight of the whole polymerizable monomers.

22. A photochromic cured product obtained by curing the curable composition of claim 21.

23. The photochromic cured product of claim 22 which is formed as a lens.

24. The photochromic cured product of claim 22 which is a coating layer of a lens.

* * * * *